(12) United States Patent
Steinich

(10) Patent No.: US 8,305,072 B2
(45) Date of Patent: Nov. 6, 2012

(54) FLAT PROFILE TRAVEL DISTANCE SENSOR

(75) Inventor: Klaus Manfred Steinich, Zorneding/Poring (DE)

(73) Assignee: ASM Automation Sensorik Messtechnik GmbH, Moosinning (DE)

(*) Notice: Subject to any disclaimer, the term of this patent is extended or adjusted under 35 U.S.C. 154(b) by 444 days.

(21) Appl. No.: 12/658,513

(22) Filed: Feb. 11, 2010

(65) Prior Publication Data

US 2010/0207612 A1    Aug. 19, 2010

(30) Foreign Application Priority Data

Feb. 13, 2009 (DE) .......................... 10 2009 008 909

(51) Int. Cl.
*G01B 7/14* (2006.01)

(52) U.S. Cl. .......... 324/207.21; 324/207.13; 324/207.24

(58) Field of Classification Search .............. 324/207.21, 324/207.13, 207.24, 207.11, 207.12, 207.16, 324/207.22, 235, 260, 262; 73/488, 290, 73/313, 314; 33/700, 701
See application file for complete search history.

(56) References Cited

U.S. PATENT DOCUMENTS 5,313,160 A * 5/1994 Gloden et al. ........... 324/207.13
* cited by examiner

*Primary Examiner* — Patrick Assouad
*Assistant Examiner* — Alesa Allgood
(74) *Attorney, Agent, or Firm* — Head, Johnson & Kachigian, P.C.

(57) ABSTRACT

In order to facilitate the assembly of an elongated magnetostrictive sensor in an enveloping tight protective profile, the sensor unit according to the invention comprises a head piece which closes the face of the protective profile and which partially reaches into the protective profile, wherein the wave conductor unit and also the circuit board are initially connected form locked with the head piece and electrically connected therewith.

18 Claims, 6 Drawing Sheets

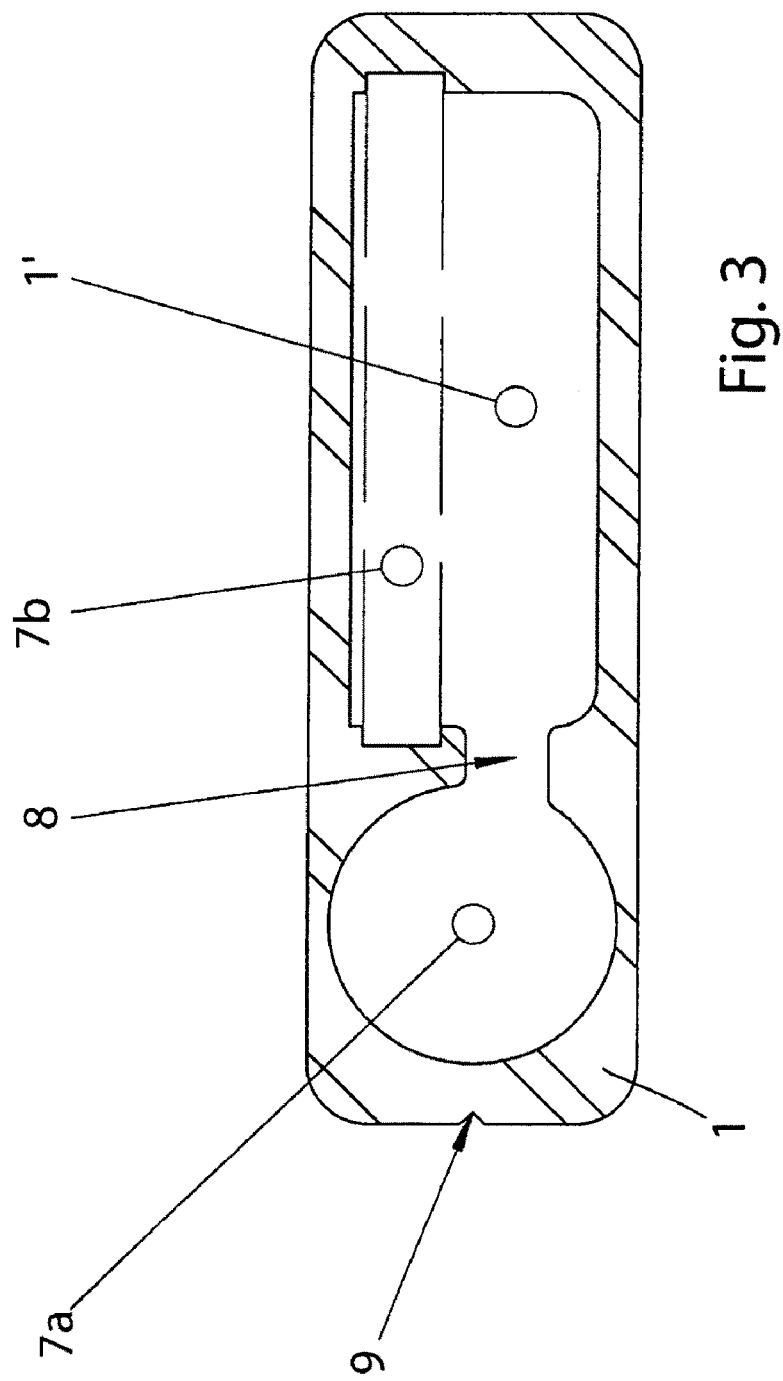

FLAT PROFILE TRAVEL DISTANCE SENSOR

I. FIELD OF THE INVENTION

The invention relates to a magnetostrictive travel distance measurement device.

II. BACKGROUND OF THE INVENTION

The basic principle of such a device includes that a wave conductor made from an electrically conductive and also magnetizable material extends in the measurement direction, thus the longitudinal direction of the device.

A magnet is connected to the component, whose position in longitudinal direction shall be measured or monitored, and is being moved touch free by the component in longitudinal direction along the wave conductor, however, at a distance which is sufficiently small.

A current impulse imparted into the wave conductor causes a mechanical-elastic density wave through the interaction with the magnet, which density wave runs from the position of the magnet along the wave conductor, and is detected with respect to its runtime by the processing electronics, which is typically disposed at one end of the wave conductor, and the longitudinal position of the magnet relative to the wave conductor and thus of the component to be monitored are known from the detection.

Since such travel distance measurement devices are also often being used in production equipment, they have to comply with numerous requirements, like protection of the measurement device against mechanical damages and contamination, in particular against penetration of moisture into the processing electronics, maintaining the original condition of the wave conductor, shielding the electromagnetic radiation of the processing electronics in outward and inward direction, ease of assembly and maintenance of the measurement device.

On the one hand, it is already known in this respect to receive the wave conductor in a supporting, however, not excessively damping encasement, and to handle it as a wave conductor unit in this configuration.

On the other hand, it is already known to dispose the wave conductor or said wave conductor unit in a protected manner in the interior of a circumferentially closed hollow protective profile, which can be produced as an extruded profile in a cost effective manner.

Thus, for different applications, different shapes of protective profiles are required, e.g. as a function of
- how stable the protective profile has to be with respect to bending in transversal direction;
- if the magnet has to be, or can be supported form locked or freely moving along the protective profile in order to influence the longitudinal sensor;
- the protective profile itself has to be receivable in a particularly circular inner contour, in particular in another protective tube;
- how much cross sectional space is provided for mounting a protective profile, in particular in which ratios (width versus height).

Thus it is the most common boundary condition that only a very small height is available for disposing the sensor unit and thus of the protective profile, typically in an order of magnitude of only 12 mm at the most, while the available width is significantly greater.

III. BRIEF DESCRIPTION OF THE INVENTION a) Object of the Invention

Thus, it is the object of the invention to provide a sensor unit which is configured very flat and can still be produced in a simple and cost effective manner.

b) Solution

This object is accomplished through the features of claims 1 and 16. Advantageous embodiments can be derived from the dependent claims.

Through fabricating a headpiece which precisely fills the free inner cross section of the profile with its seal section, and through the mounting options at the mounting section of the headpiece on one side for the circuit board protruding from the headpiece in longitudinal direction and, on the other side for the wave conductor unit extending parallel thereto, an assembly is provided, which can be preassembled outside of the profile in a simple manner, and which subsequently only has to be inserted into the protective profile with the wave conductor unit and the circuit board in front, until also the headpiece subsequent to the circuit board and wave conductor unit is disposed completely in the interior of the protective profile.

The form locked mounting devices for the wave conductor unit and for the circuit board at the headpiece are thus configured, so that they are secured self-acting through the surrounding protective profile after insertion into the protective profile, and so that they can only be disengaged outside of the protective profile.

Thus, the headpiece is fabricated so precisely fitted into the inner free cross section of the protective profile, and is preferably made of a material, which has a sufficient friction at its surface relative to the inner surface of the protective profile, so that an additional fixation of the headpiece in the protective profile is not necessary after the headpiece is positioned in the protective profile.

After inserting the subassembly into the protective profile, only the open faces of the unit have to be closed, wherein the output cable for running out the already processed signals of the sensor unit have to be accommodated on the face oriented towards the headpiece.

Closing can be performed by applying and gluing, encasing or welding face covers, possibly the cover section of the headpiece itself, or through tight encasement of the free inner cross sections in the end portion of the protective profile.

The free inner cavity of the protective profile is divided into a wave conductor cavity and a circuit board cavity which are configured, so that the wave conductor unit can be inserted as well as the circuit board, and both are supported in transversal direction possibly without clearance.

The two inner cavities are preferably connected to one another over the entire length of the protective profile through a constricted portion and form a joint cavity or cavities separated by a bar are provided, which, however, has the disadvantage that at least in the end portion of the protective profile, where the headpiece shall be inserted subsequently, which extends over the entire inner cross section, this bar has to be removed, which requires machining the protective profile in addition to just cutting it off, which typically shall be avoided.

When the cavities are connected, the connecting constricted portion opens into the approximately rectangular circuit board cavity in the center elevation portion, so that a tub shaped base of the circuit board cavity is provided, which has a lateral boundary, wherein the width of the circuit board cavity corresponds to the width of the circuit board to be received, and thus provides lateral support for the circuit board. In the other transversal direction, along the height of the circuit board, the height of the circuit board cavity is sized so that it corresponds to the height of the circuit board including the electronic components placed thereon and including electrical conductors possibly run over it, and also provides lateral support in this direction.

The cross section of the wave conductor cavity is configured, so that it is suitable for receiving a wave conductor unit comprising a circular outer circumference. Thus, the wave conductor cavity preferably comprises a circular inner circumference, which is only interrupted by the outlet of the constricted portion connecting the two inner cavities.

In order for the user to know in assembled state of the sensor unit at which location within the protective profile the wave conductor unit is disposed, and to which location he has to move the positioning magnet as closely as possible, a longitudinally extending marking, preferably in the form of a continuous marking groove, is fabricated along the outer circumference which is typically a rectangular outer circumference, wherein the marking extends in longitudinal direction on one of the narrow sides of the protective profile. Beyond the configuration of the outer cross section of the headpiece, the headpiece comprises a particular configuration.

In one aspect, the headpiece is used as a pull relief for the cable leading out of the sensor unit, in that the cable is encased during the injection molding process of the plastic headpiece. Preferably, the cable extends proximal to the one narrow side of the cross section through the headpiece, while the wave conductor unit, which mostly also has a circular cross section, is disposed proximal to the other opposite narrow side at the headpiece.

This is provided in that a groove is provided in the headpiece which is at least open in one direction and is provided for form locked insertion of the end of the wave conductor unit.

In order to fixate the wave conductor unit therein also in longitudinal direction, the wave conductor unit comprises a thickened end portion and the groove comprises a respective recess. The groove is open towards one of the broad sides of the cross section of the headpiece, so that the wave conductor unit can be inserted from there, but so that it is fixated form locked therein, as soon as the wave conductor unit and the headpiece are jointly disposed in the inner free cross section of the protective profile.

By the same token, the headpiece comprises a contact surface for the end of the circuit board, which contact surface extends in longitudinal direction to the main plane, thus the large extension of the cross section of the protective profile. This contact surface is moved backward by the thickness of the circuit board from the outer circumference of the headpiece, and a pinion protrudes from the contact surface towards the outer circumference of the headpiece, which pinion is configured for insertion into a respective positioning bore hole of the circuit board when the circuit board contacts the contact surface of the headpiece.

Additionally, also an end stop surface for the circuit board can be configured at the headpiece, which then extends transversally to the longitudinal direction, so that forces loading the circuit board in longitudinal direction do not have to be exclusively reacted by the pinion of the headpiece.

The base of the circuit board is aligned with the headpiece in connected state and is then aligned with one of the longitudinal outer surfaces of the headpiece.

For the function of the sensor unit, its components have to be connected to one another through cables, thus the wave conductor unit has to be connected to the circuit board and also the outgoing cable has to be connected to the circuit board.

For this purpose, a cable groove is disposed in the headpiece on one of the outer surfaces, which cable groove extends from the groove for the wave conductor unit to the end stop surfaces of the circuit board and is used for running the cable connection between these two components.

The connection between cable and circuit board is implemented in that the circuit board end of the cable protrudes on the face side from the headpiece at one location, at which the circuit board is disposed below the cable. In this portion above the circuit board, the outer jacket is removed from the cable, so that the cross section of the particular strands is much smaller than the cross section of the entire cable, and so that the strands can be run above the circuit board to the plug connector approximately in the center of the length of the circuit board, wherein they are connected to the plug connector. The plug connector for connecting the strands run out of the wave conductor unit, however, is preferably disposed proximal to the mounting end of the circuit board opposite to the headpiece.

This configuration helps to minimize the number and the length of the conductive paths required on the circuit board leading to the particular electronic components.

The portion of the headpiece facing away from the wave conductor unit and from the circuit board does not have any recesses and is a solid cross section which fits precisely into the inner free cavity of the protective profile and completely encloses the protective profile, and thus functions as a sealing section in inserted state. For this purpose, the headpiece is preferably made of an elastic plastic material like e.g. polyurethane.

In order for the friction forces not become too large when the entire unit is inserted into the protective profile, in particular for the wave conductor unit which contacts the protective profile with its entire circumference, in particular when the inner circumference of the wave conductor unit is typically also circular, the wave conductor unit is provided with a textile coating at its outer circumference which has a low coefficient of friction, wherein the wave conductor unit is coated over the large central longitudinal extension, thus besides the two ends, wherein the coating is preferably glued on the outside onto the metal support tube of the wave conductor unit and comprises outward protruding fibers or loops which simultaneously provide good damping for the wave conductor unit in transversal direction relative to the protective profile.

Thus, a respective sensor unit can be produced in a very simple and cost effective manner.

Initially, the headpiece has to be fabricated by inserting the output cable over a defined length portion into the mold for encasement through the headpiece by integral molding when producing the headpiece.

After the end portion of the cable, which end portion protrudes from the headpiece and is oriented towards the circuit board, is relieved of its cable jacket and a plug is disposed at the strands, only the wave conductor unit and the circuit board have to be disposed form locked at the headpiece at the specific mounting devices, and eventually the electrical connections run from the wave conductor unit and also the cable with the respective plug connector units of the circuit board have to be connected.

Eventually, the unit thus completed can also be inserted in longitudinal direction into the protective profile with the wave conductor and the circuit board in front, since both of them extend in longitudinal direction, until the headpiece is also completely disposed within the protective profile.

After closing the open ends of the protective profile, the sensor unit is completed.

Thus, closing can be performed in different manners.

As long as the headpiece, and at the opposite end, an end piece are made of plastic, they can be glued together in the profile or can be provided with an additional jacket after insertion into profile, which jacket bridges the contact gap between end piece and profile and is preferably provided through integral injection molding with a plastic material.

The closing, however, can also be performed through an end cover made of metal, preferably aluminum, which is preferably configured plate shaped, and which is placed onto the front face of the profile and which is welded to the profile, preferably welded through a laser.

However, then it is a prerequisite that the headpiece is disposed completely in the interior of the profile.

On the side where the cable is run out, such an end cover certainly has to have a cable pass-through, which has to be sealed accordingly relative to the cable.

c) Embodiments

Embodiments according to the invention are subsequently described in more detail with reference to drawing figures, wherein:

FIG. 1b illustrates a longitudinal sectional view through the completed sensor unit according to FIG. 1a;

FIG. 2b illustrates an enlarged detail of FIG. 2a;

FIG. 3 illustrates a cross section of the sensor protective profile.

Figure 1A:
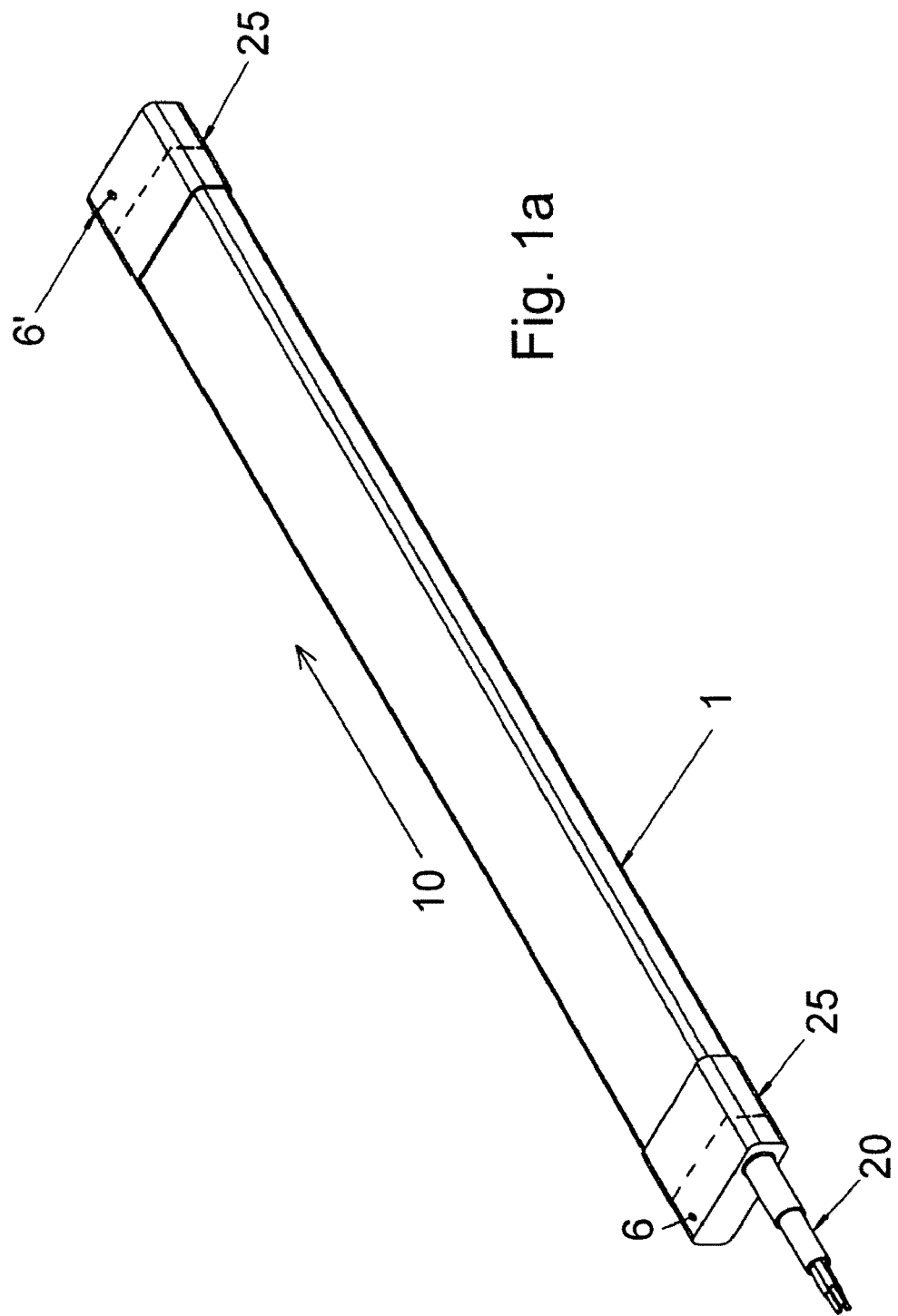
FIG. 1a illustrates the completed sensor unit.

FIG. 1a shows a perspective view of the completed sensor unit, of which the protective profile 1 is visible in the center portion, which protective profile extends in the longitudinal direction 10, whose face end portions are closed with an encasement 25, wherein the cable 20 runs out of the encasement 25 on the face side.

Figure 2A:
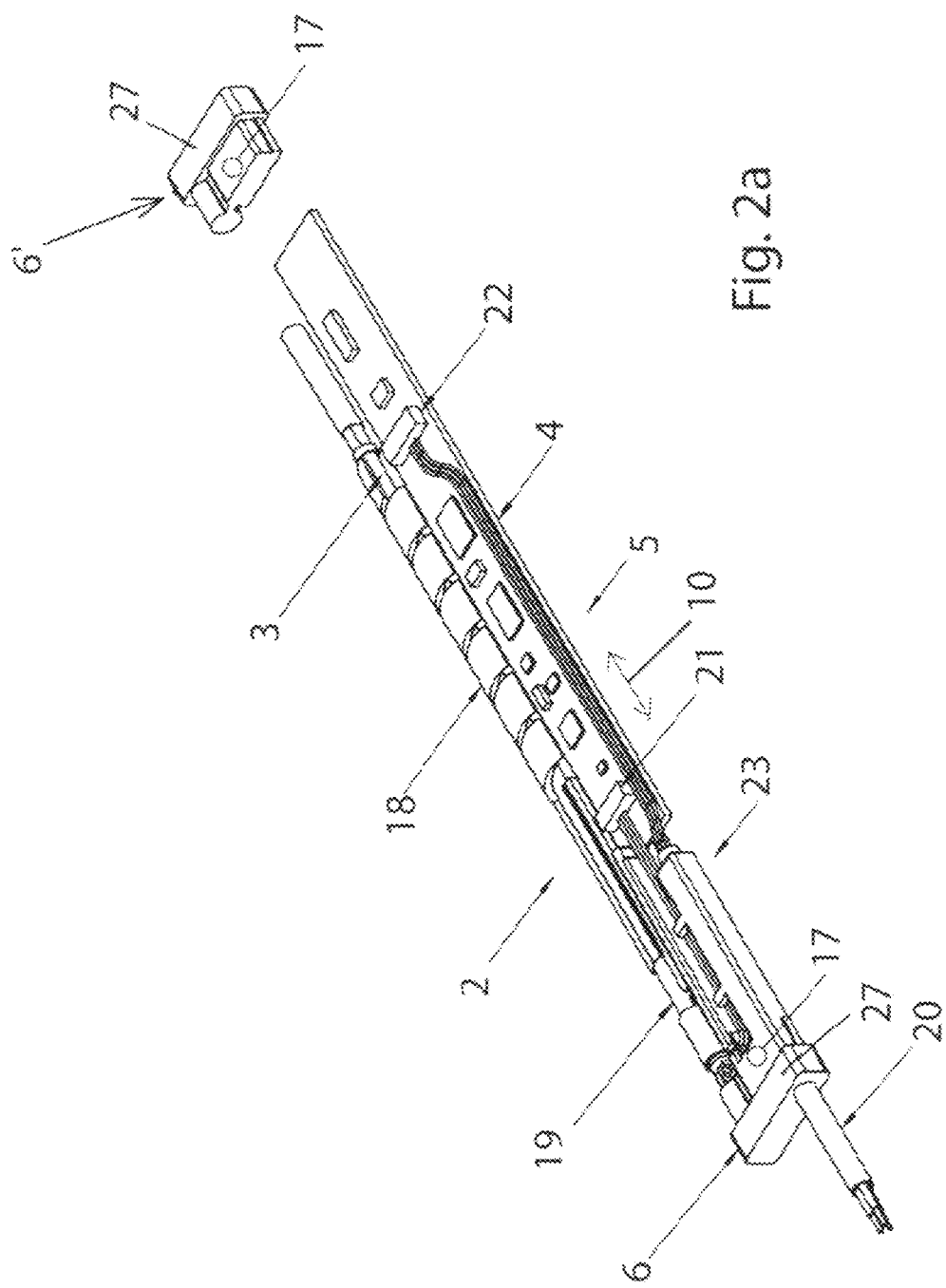
FIG. 2a illustrates the sensor unit without the surrounding protective profile.

The end piece 6' is disposed under the encasement 25 at the right end in FIG. 1a, and the headpiece 6 is disposed under the left end, which, however, as illustrated in FIG. 2a in the same position, but without the protective profile 1, comprise a seal section 17, whose outer contour corresponds to the free inner cross section 1' of the protective profile 1 and corresponds to a cover section 27 connected thereto, which cover section is integrally configured with the seal section 17 and whose outer circumference corresponds to the outer circumference of the protective profile 1.

Figure 2B:
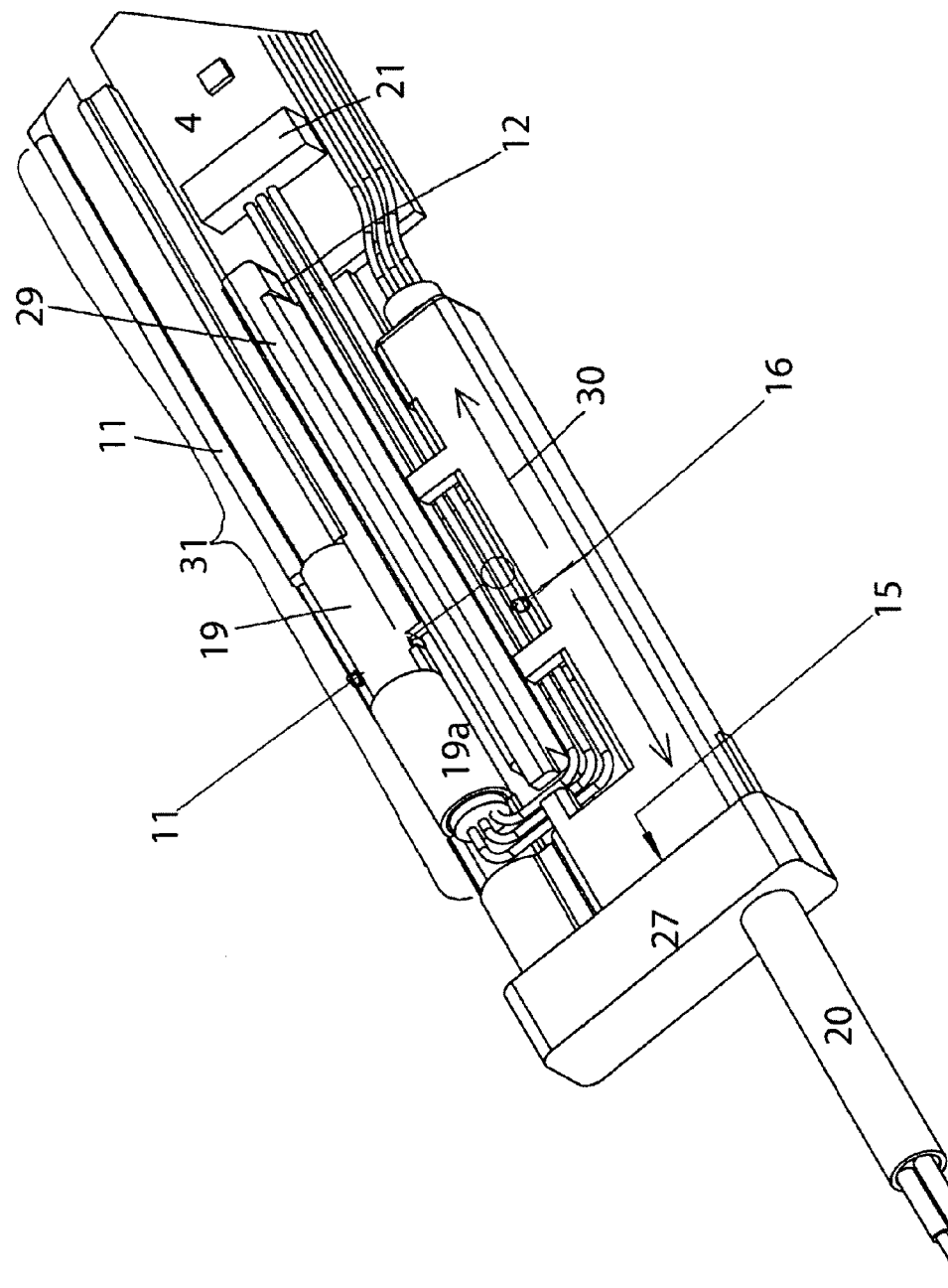
Figure 2C:
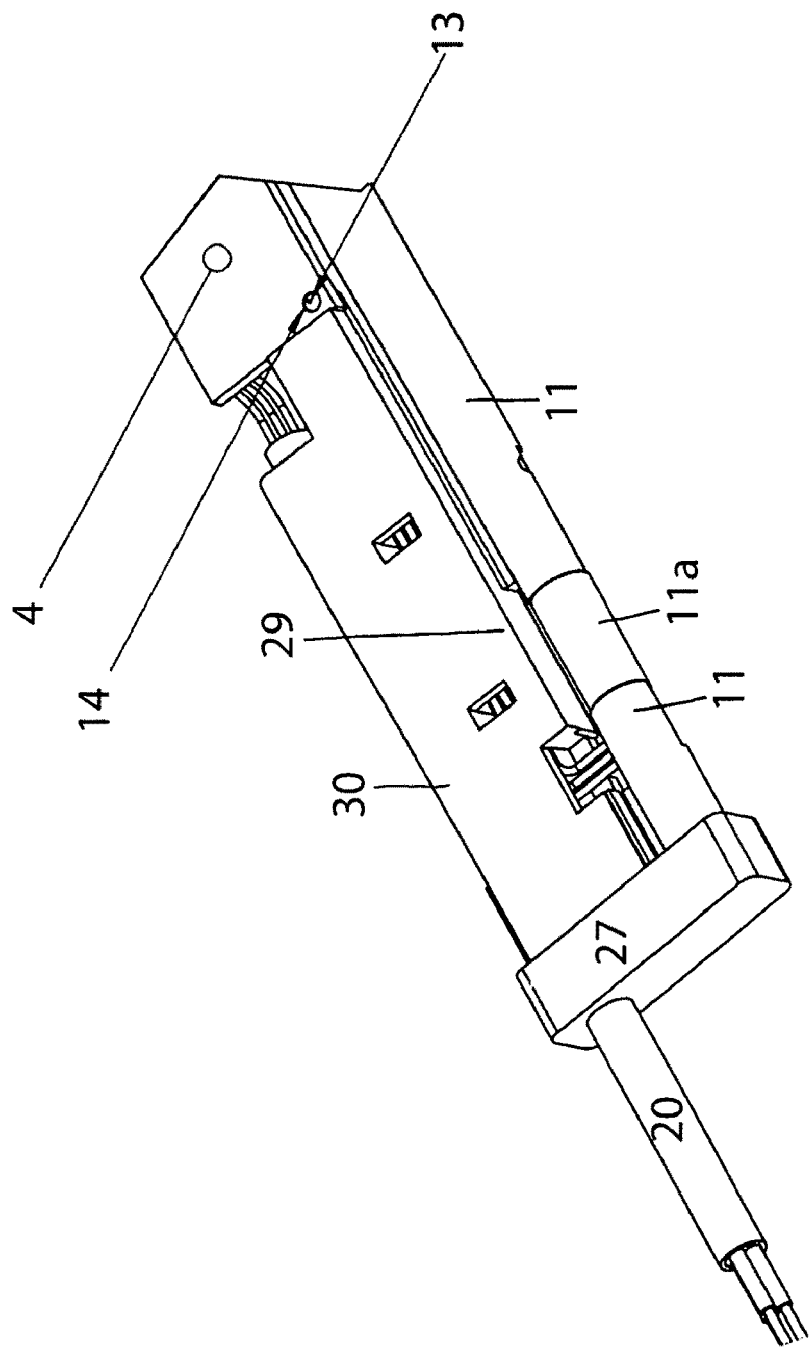
FIG. 2c illustrates the rearview of the illustration of FIG. 2b.

As evident from FIG. 2a, and from the detail enlargements according to FIG. 2b and FIG. 2c, the wave conductor unit 2 also extending in longitudinal direction 10 and also the circuit board 4 extending in longitudinal direction 10 are respectively connected form locked to the headpiece 6, which jointly form a subassembly 23 for face forward insertion into the protective profile 1, whose cross section is illustrated in FIG. 3.

The protective profile 1 has an outer cross section contour configured as a flat rectangle with rounded corners, wherein a marking groove 9 also extending in longitudinal direction 10 is disposed in one of the narrow sides.

The free inner cross section 1' of the protective profile 1 is comprised of a wave conductor cavity 7a and a circuit board cavity 7b, which are connected at least in the end portion of the profile 1, in which the seal section 17 of the headpiece 6 or of the headpiece 6' are inserted, through a constriction 8, preferably, however, they are connected with one another over the entire length of the profile 1 through this constriction 8.

Since the wave conductor unit 2, which shall be inserted into the wave conductor cavity 7a, has a circular outer circumference, the wave conductor cavity 7a has a circular inner circumference, which is only interrupted by the outlet of the constriction 8 in this circular inner circumference.

This wave conductor cavity 7a is disposed proximal to the narrow side of the rectangular contour of the profile 1, in which the marking groove 9 is disposed.

The diameter of the wave conductor cavity 7a also defines the thickness of the protective profile 1, thus the smaller of the rectangular cross section dimensions, since it is selected as small as possible beyond the diameter of the wave conductor cavity 7a, so that a barely sufficient wall thickness of the protective profile 1 is left about the wave conductor cavity 7a.

The circuit board cavity 7b disposed in transversal direction, thus the large dimension of the cross section of the protective profile 1 next to the wave conductor cavity 7a, is configured substantially rectangular, wherein the constriction 8 opens into the narrow side of this rectangular contour in the lower half, while circuit board grooves 27a, b opposite to one another are configured in the upper half in the narrow sides of this rectangular contour.

The free space between the bases of the circuit board grooves 28a, b is slightly greater than the width of the circuit board 4, which is inserted into these circuit board grooves 28a, b in longitudinal direction 10, wherein the components disposed on the circuit board 4 protrude in the direction of the other half of the circuit board cavity 7b, into which the constriction 8 opens as well.

The width, thus the large extension of the rectangular contour of the protective profile 1, is defined by the sum of the dimensions of the adjacent cavities, thus the wave conductor cavity 7a and the circuit board cavity 7b, in that it is only selected slightly larger in order to assure the necessary wall thickness about this inner cavity.

As illustrated best in FIG. 2a, the end piece 6', which is typically a plastic component made from plastic material, like e.g. polyurethane, manufactured through injection molding, comprises a seal section 17, which precisely fits into the free inner end cross section 1' of the protective profile 1 and is preferably pressed in with slight oversize, and a cover section 27 connected thereto with a greater rectangular cross section, which is used for the outer dimensions of the protective profile 1 and which contacts the end stop surface 15 between the cover section 27 and the seal section 17 at the face of the profile 1.

The headpiece 6 at the other end of the sensor unit differs from the end piece 6' in that a mounting section 31 connects to the free end of the seal section 17, which mounting section is in turn integrally configured with the seal section 17 and the cover section 27 of the headpiece 6 and which is used for form locked mounting of the wave conductor unit 2 and of the circuit board 4 at the headpiece 6.

The wave conductor unit 2 comprises a support tube 19 substantially extending over the entire length of the wave conductor unit 2. Therefore the mounting section 31 comprises a groove 11 with a circular segment shaped cross section of less than 180° on one side of the groove 11, into which cross section the support tube 19 can be inserted in a form locked manner.

In order to provide an additional form locked fixation in longitudinal direction 10, the support tube 19 comprises a thickened portion 19a and the groove 11 comprises a recess 11a over a respective length for receiving the thickened portion 19a.

The groove 11 is open towards a broad side of the cross section of the cover section 27 for inserting the wave conductor unit 2, which furthermore comprises an elastic coating 18 in its center portion on the outer circumference of the support tube 19, e.g. a textile coating, which can also be wound up in a spiral shape, and which is otherwise used for mechanical spring elastic support and damping relative to the surrounding protective profile 1, and on the other side for cross section enlargement to the dimension of the diameter of the wave conductor cavity 7a.

As illustrated best in FIG. 2b, the mounting section 31 furthermore comprises a bar 29, which is disposed parallel to the groove 11, but offset towards the center portion of the cross section of the headpiece 6, and which has a height which corresponds to the entire height of the free inner cross section 1' of the profile 1.

At its free end, this bar 29 comprises a shoulder corresponding to the thickness of the circuit board 4, which is oriented in opposite direction to the open side of the groove 11. A pinion 13 extends from the shoulder in the opposite direction.

Thus, the circuit board 4 can be placed as a stop surface 12 onto the shoulder of the bar 29, thus in opposite direction to the insertion direction of the wave conductor unit 2, in that it has a positioning bore hole 14 at the respective location of the pinion 13, into which positioning bore hole the pinion 13 protrudes when the circuit board 4 contacts the stop surface 12, thus positioning the circuit board 4 in longitudinal direction 10 and also in transversal direction, wherein a positioning in transversal direction is additionally provided through the contact of the longitudinal edge at the circuit board 4 at the side of the groove 11.

A fixation in the second transversal direction, thus the shorter extension direction of the headpiece 6 is performed by the surrounding profile 1 after inserting the subassembly 23 comprised of the head piece 6, the wave conductor unit 2 and the circuit board 4 into the profile 1.

In order to run signals from the processing electronics 5, disposed on the circuit board 4, from the sensor unit to the outside, a cable which is connected in an electrically conductive manner with the circuit board 4 through a plug connector unit 22 extends through the headpiece 6 in longitudinal direction on the opposite side facing away from the groove 11 through a cable pass-through portion 30, in which the cable 20 is enveloped by the tightly adhering material of the cable pass-through portion 30, in that the cable 20 was integrally molded into this cable pass-through portion 30 in the headpiece 6 during production of the headpiece 6.

The cable pass-through portion 30 approximately comprises the length of the groove 11 and is connected in transversal direction with the bar 29, wherein a cable groove 16 which is open to the outside is left there between in order to run connections at this location through single strands 20a, b from the rear end of the wave conductor unit 2 to the beginning of the circuit board 4 and to a plug connector 21 disposed at this location, in order to electronically connect the wave conductor unit 2 with the processing electronics 5 on the circuit board 4.

Within the profile 1, the jacket of the cable 20 is removed and only the particular strands 20a, b are run to the plug connector unit 21.

The plug connector units 21 and 22 on the circuit board 4 have such a height that the circuit board 4 can still be inserted into the circuit board grooves 28a, b of the circuit board cavity 7b.

After insertion of the subassembly 23, comprised of the headpiece 6, wave conductor unit 2 and the circuit board 4 from the one open face and the end piece 6' from the other open face into the protective profile 1, until the respective cover sections 27 contact the faces of the protective profile 1, an additional sealing between the headpiece 6 and the end piece 6' and the profile 1 has to be performed if required by the respective application.

Figure 1B:
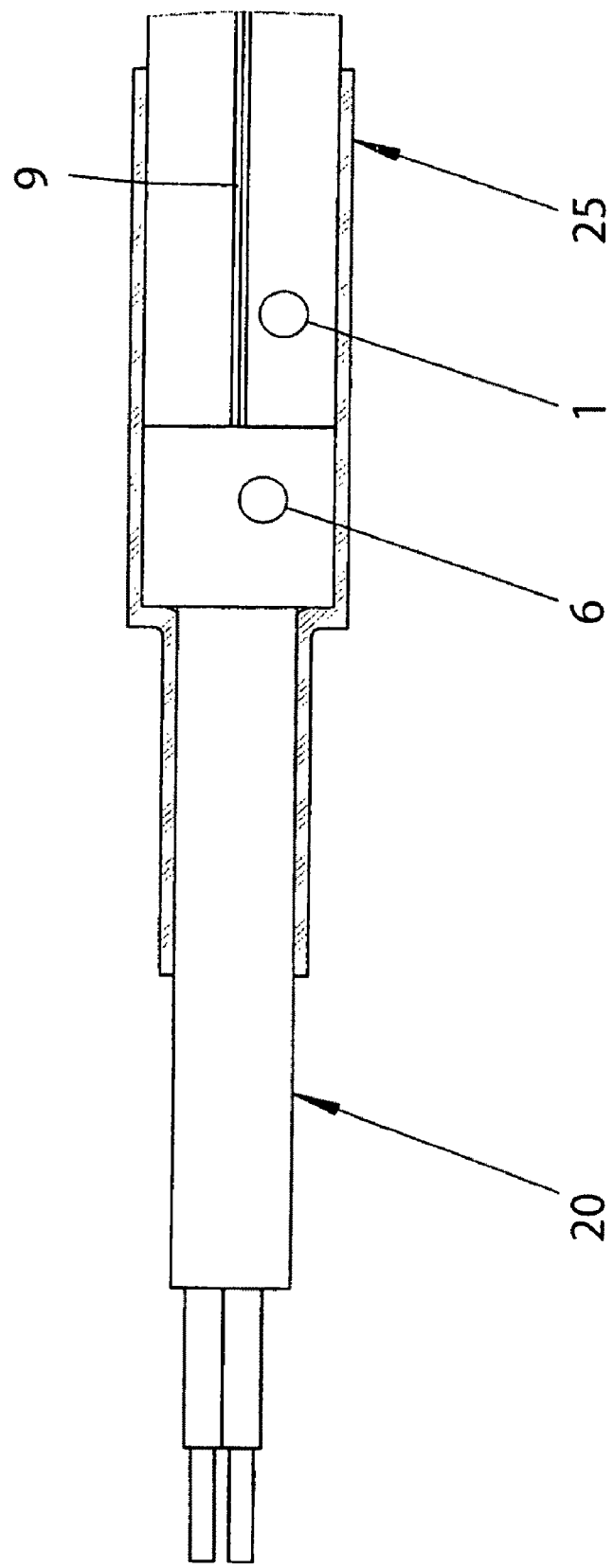

For a headpiece 6 or an end piece 6' made out of plastic, this can be performed by gluing together with the profile 1, preferably, however, according to the FIGS. 1a and 1b through an additional jacket 25, which extends over the entire circumference and extends in longitudinal direction over the contact gap, and furthermore extends sufficiently far in both longitudinal directions, thus on the one side, onto the profile 1 and, on the other side, at the headpiece 6 onto the cable 20 with such a respective length, that a sufficient sealing is achieved through the material of the jacket 25 which tightly contacts these components, which jacket is preferably produced through inserting the sensor unit in these portions into an injection mold and encasing with plastic through injection molding.

When the end piece 6' is inserted, the jacket 25 also reaches about the entire face of the cover section 27.

REFERENCE NUMERALS AND DESIGNATIONS 1 profile, protective profile
1' free inner cross section
2 wave conductor unit
2a end portion
3 wave conductor
4 circuit board
5 processing electronics
6 headpiece
6' end piece
7a wave conductor cavity
7b circuit board cavity
8 constriction
9 marking groove
10 longitudinal direction
11 groove
11a recess
12 contact surface
13 pinion
14 positioning bore hole
15 end stop surface
16 cable groove
17 seal section
18 textile coating
19 support tube
19a thickened portion
20 cable
20a, b strand
21 first plug connector unit
22 second plug connector unit
23 subassembly
24 weld
25 jacket
26 encoder magnet
27 cover section
28a, b circuit board grooves
29 bar
30 cable pass-through portion
31 mounting section

The invention claimed is:
1. A sensor unit, comprising:
a sensor protective profile (1), configured as a hollow, circumferentially closed profile (1) with a cross section contour in longitudinal direction (10), which is in particular continuous;

a travel distance measurement sensor in the interior of the profile (1), comprising:
  a wave conductor unit (2), wherein the wave conductor (3) of the wave conductor unit (2) extends in longtidunal direction (10) of the profile (1);
  a circuit board (4) with processing electronics (5) in the interior of the profile (1), whose main extension runs in the longitudinal direction (10) of the profile (1);
  the sensor unit comprises a headpiece (6), which comprises form locked mounting devices for the wave conductor unit (2) and for the circuit board (4); and
  the headpiece (6) with the conductor unit (2) and the circuit board (4) form a subassembly 23, which is at least partially disposed in the free inner cross section (1') of the profile (1).

2. A sensor unit according to claim 1, wherein the headpiece (6) in the portion facing away from the wave conductor (3) and from the circuit board (4) comprises a seal section (17), whose outer circumference completely fills the free inner cross section (1') of the protective profile, and in particular contacts it under a preload.

3. A sensor unit according to, claim 1 wherein the protective profile (1) comprises a rectangular outer circumference along whose narrow side a longitudinally extending marking, in particular a marking groove (9) for characterizing the wave conductor side, is provided.

4. A sensor unit according to, claim 1 wherein the headpiece (6) comprises a groove (11) extending in longitudinal direction (10) for inserting the end of the wave conductor unit, which comprises in particular a recess (11a), in particular a recess for receiving the thickened end portion (2a) of the wave conductor unit (2).

5. A sensor unit according to, claim 1 wherein the headpiece (6) comprises a contact surface (12) extending in longitudinal direction (10) for the end of the circuit board (4), which contact surface is moved backward by the thickness of the circuit board (4) from the outer circumference of the headpiece (6), and from which an extension, in particular a pinion (13), extends transversally tot he main plane of the headpiece (6) in the direction to the outer circumference of the headpiece (6) for form locked engagement in a respectively positioning bore hole of the circuit board.

6. A sensor unit according to, claim 1 wherein the headpiece (6) comprises an end stop surface (15) for the face of the circuit board (4), which extends transversally to the longitudinal direction (10).

7. A sensor unit according to, claim 1 wherein the headpiece (6) comprises a cable groove (16) for running the cable connection between the rear end of the wave conductor unit (2) and the rear end of the circuit board (4).

8. A sensor unit according to, claim 1 wherein the cable (20) extending out of the sensor unit is integrally encased through injection molding in the headpiece (6), in particular on the narrow side opposite to the wave conductor unit (2), and the headpiece (6) for the cable (20) is used as pull relief.

9. A sensor unit according to, claim 1 wherein the headpiece (6) is made from a plastic material, in particular an elastic plastic material, like e.g. polyurethane.

10. A sensor unit according to, claim 1 wherein a first plug connector unit (21) is provided on the circuit board (4) for connecting the wave conductor unit (2) at the rear end adjacent to the headpiece (6), and a second plug connector unit (22) for connecting the output cable (20) is disposed in the center portion of the length of the circuit board (4).

11. A sensor unit according to, claim 1 wherein the wave conductor unit (2) is provided in the center longitudinal portion with an elastic, in particular textile coating (18) on the outer circumference of its support tube (19) for support and damping in the protective profile (1).

12. A sensor unit according to, claim 1 wherein the sensor unit is closed on the face side through a glued on or welded on cover.

13. A sensor unit according to claim 1, wherein the free inner cross section (1') of the protective profile (1) is divided into a wave conductor cavity (7a) and a circuit board cavity (7b), which are connected to one another through a constriction (8) at least at one end of the profile (1).

14. A sensor unit according to, claim 13 wherein the wave conductor cavity (7a) is configured for receiving a wave conductor unit (2) with a circular outer circumference and comprises in particular an inner circumference which is circular besides the open constriction (8).

15. A sensor unit according to, claim 13 wherein the constriction (8) opens into the circuit board cavity (7b), and aligned circuit board grooves (28a, b) are provided in the side walls of the circuit board cavity (7b) comprising an inner width between one another which corresponds to the width of the circuit board (4) to be received.

16. A method for producing a sensor unit, comprising:
  the cable (20) is inserted with a defined length portion into a mod for integral injection molding with the headpiece (6);
  the headpiece (6) is injection molded and removed out of the mold after hardening;
  the end of the cable (20) protruding beyond the headpiece is relieved of the cable jacket;
  a plug connector is connected in an electrically conductive manner at the end of the cable (20) at the strands (20a,b) thus exposed;
  the end portion of the wave conductor unit (2) is inserted into the headpiece (6) in a form locking manner;
  the end portion of the circuit board (4) is connected in a form locked manner with the headpiece (6);
  the strands (20a, b) from the wave conductor unit (2) are inserted into the cable groove (16) of the headpiece (6), and the plug is connected to the plug strip on the circuit board (4) and the output cable (20) is connected tot he plug unit of the circuit board (4); and
  the subassembly (23) comprising the headpiece (6), the wave conductor unit (2) and the circuit board (4) and the cable (20) is inserted into the protective profile (1) in longitudinal direction until the headpiece (6) is completely received in the interior of the protective profile (1).

17. A method according to claim 16, wherein the end of the protective profile (1) is closed by gluing, encasing and/or jacketing the gap portion between the end piece (6') or the headpiece (6) and the profile (1), as long as the end piece or the headpiece are made of plastic material.

18. A method according to claim 16, wherein the end of the protective profile (1) is closed by welding, in particular laser welding of a cover placed onto the face of the profile (1), which cover is made from metal, in particular aluminum.

* * * * *